United States Patent
Leszczynski et al.

(10) Patent No.: US 10,132,180 B2
(45) Date of Patent: Nov. 20, 2018

(54) MOULD FOR AN ABRADABLE TRACK BENEATH THE INNER SHROUD OF AN AXIAL-FLOW TURBOMACHINE COMPRESSOR

(71) Applicant: Techspace Aero S.A., Herstal (Milmort) (BE)

(72) Inventors: Charles Leszczynski, Hermee (BE); Guy Biemar, Blegny (BE)

(73) Assignee: Safran Aero Boosters SA (BE)

( * ) Notice: Subject to any disclaimer, the term of this patent is extended or adjusted under 35 U.S.C. 154(b) by 620 days.

(21) Appl. No.: 14/728,362

(22) Filed: Jun. 2, 2015

(65) Prior Publication Data
US 2015/0354396 A1 Dec. 10, 2015

(30) Foreign Application Priority Data
Jun. 5, 2014 (BE) .................. 2014/0428

(51) Int. Cl.
*F01D 9/04* (2006.01)
*F01D 5/02* (2006.01)
(Continued)

(52) U.S. Cl.
CPC .............. *F01D 9/044* (2013.01); *B29C 33/40* (2013.01); *B29C 70/74* (2013.01); *F01D 5/02* (2013.01);
(Continued)

(58) Field of Classification Search
CPC .......... F01D 9/044; F01D 5/02; F01D 11/001; F01D 11/122; B29C 33/40; B29C 70/74
See application file for complete search history.

(56) References Cited

U.S. PATENT DOCUMENTS 3,856,908 A * 12/1974 Harper ................ B29C 33/405
264/313
4,349,313 A 9/1982 Munroe et al.
(Continued)

FOREIGN PATENT DOCUMENTS

| EP | 2075416 A1 | 7/2009 |
| FR | 2977521 A1 | 1/2013 |
| WO | 2014013190 A1 | 1/2014 |

OTHER PUBLICATIONS

European Search Report from corresponding Belgium Application No. BE201400428, dated Sep. 29, 2014.

*Primary Examiner* — Jacob T Minskey
*Assistant Examiner* — Melody Tsui
(74) *Attorney, Agent, or Firm* — Sandberg Phoenix & von Gontard P.C.

(57) ABSTRACT

The invention relates to a mold for injecting a layer of abradable material, such as silicone, inside an inner shroud of an axial-flow turbomachine. The mold comprises a circular wall or tubular wall extending axially and two annular walls extending radially outwardly from the axial ends of the axial wall. Each radial wall of the mold comprises an annular hook in contact with the outer surface of the shroud so as to hold the mold against the shroud. The injection pressure presses the hooks against the shroud, providing a seal. The walls form an annular molding cavity inside the inner shroud in combination with the inner shroud. The invention also relates to a method for molding an abradable layer inside the shroud with the aid of the mold. The latter is deformed by spreading apart the hooks so as to fit over the shroud.

14 Claims, 4 Drawing Sheets

(51) Int. Cl.

| | |
|---|---|
| *B29C 33/40* | (2006.01) |
| *F01D 11/12* | (2006.01) |
| *F01D 25/28* | (2006.01) |
| *F01D 11/00* | (2006.01) |
| *F01D 25/00* | (2006.01) |
| *F01D 25/24* | (2006.01) |
| *F04D 29/16* | (2006.01) |
| *F04D 29/64* | (2006.01) |
| *B29C 70/74* | (2006.01) |
| *F04D 29/52* | (2006.01) |

(52) U.S. Cl.
CPC .......... *F01D 11/001* (2013.01); *F01D 11/122* (2013.01); *F01D 25/005* (2013.01); *F01D 25/246* (2013.01); *F01D 25/285* (2013.01); *F04D 29/164* (2013.01); *F04D 29/644* (2013.01); *F04D 29/522* (2013.01); *F05D 2220/30* (2013.01); *F05D 2230/31* (2013.01); *F05D 2230/90* (2013.01)

(56) References Cited

U.S. PATENT DOCUMENTS

| | | |
|---|---|---|
| 5,735,045 A | 4/1998 | Papayoti |
| 2004/0231155 A1 | 11/2004 | Le Saint et al. |
| 2013/0051979 A1* | 2/2013 | Durocher .................. F01D 9/04 415/115 |
| 2014/0317891 A1* | 10/2014 | Steiner .................... B29C 39/10 24/304 |

\* cited by examiner

Fig. 3
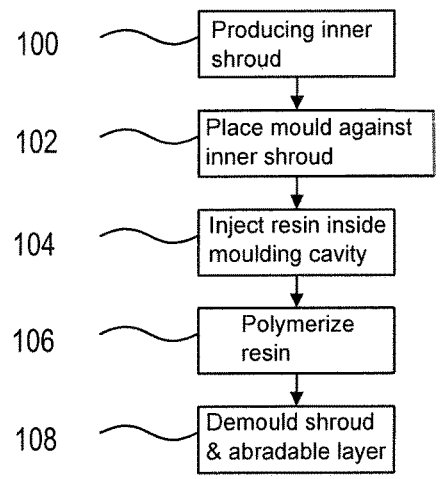
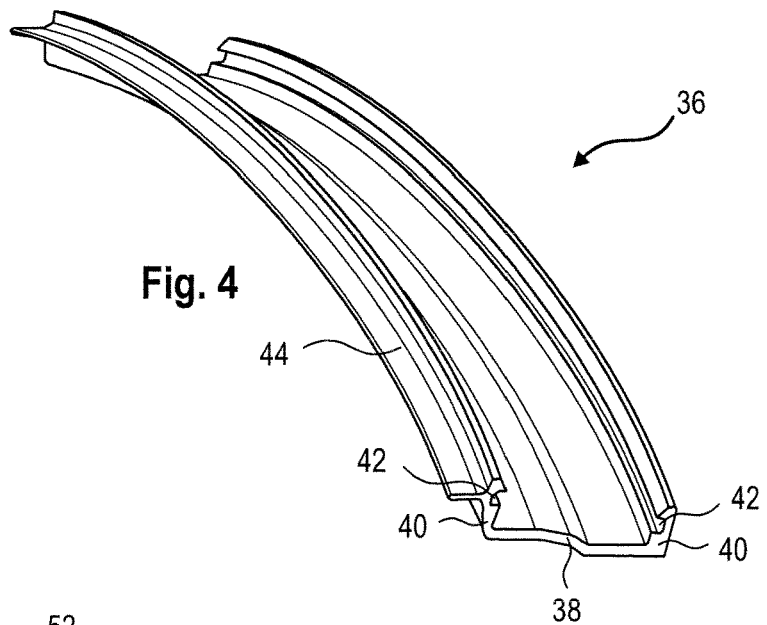
Fig. 4
Fig. 5
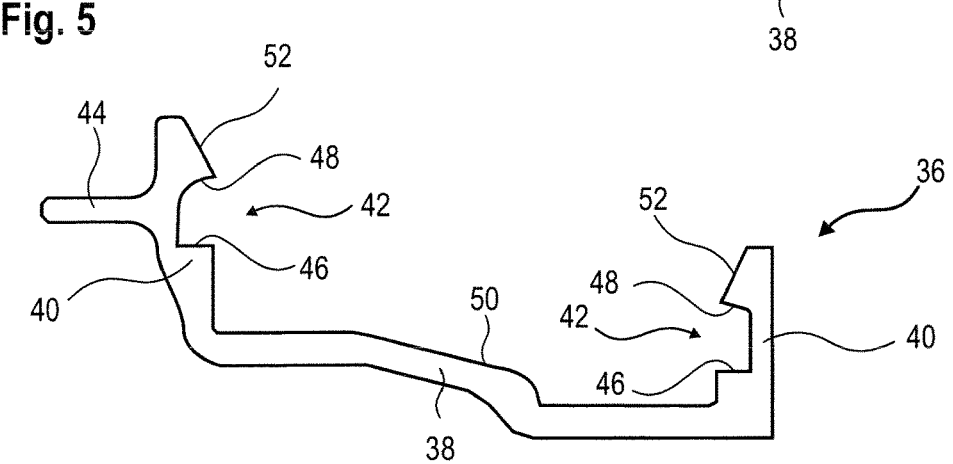

MOULD FOR AN ABRADABLE TRACK BENEATH THE INNER SHROUD OF AN AXIAL-FLOW TURBOMACHINE COMPRESSOR

CROSS-REFERENCE TO RELATED APPLICATIONS

This application claims the benefit, under 35 U.S.C. § 119, of BE 2014/0428, filed Jun. 5, 2014, the disclosure of which is incorporated herein by reference in its entirety.

FIELD

The invention relates to the injection of a layer of abradable material beneath an inner shroud of an axial-flow turbomachine. More precisely, the invention relates to an angular mould segment for injection of a layer of abradable material inside an inner shroud of an axial-flow turbomachine compressor. The invention also relates to a turbomachine equipped with a shroud with a layer of injected silicone. The invention also relates to a method for moulding a layer of abradable material inside an inner shroud of an axial-flow turbomachine.

BACKGROUND

The statements in this section merely provide background information related to the present disclosure and cannot constitute prior art.

In order to increase their compression rates, the compression stages of an axial-flow turbomachine compressor are equipped with gasket seals. These seals are applied to the inner surfaces of the outer shrouds and inner shrouds. These seals are made of abradable or friable materials, which are able to erode in the event of contact with the rotor. These seals may come into contact with ends of rotor blades or seal lips without degrading these. It is thus possible to reduce the dynamic clearances at the seals whilst preserving the mechanical integrity of the aerodynamic elements.

The seals can be made of a silicone material that is injected directly on the shroud with the aid of a mould. Such a mould can be fixed even to the stator, and defines a moulding cavity in combination with the inner shroud. The cavity thus formed corresponds generally to the definitive shape of the abradable track, if necessary the abradable track can be machined following demoulding.

Document FR2977521 A1 discloses a mould for injecting an abradable material on an inner shroud of a low-pressure compressor rectifier of an axial-flow turbomachine. The mould makes it possible to inject silicone even at the inner surface of the shroud. The injection is performed with the aid of a fixed mould centred directly on the rectifier. The mould comprises a generally tubular wall placed inside the shroud, and radial annular walls that cooperate with the shroud. The mould, combined with the inner shroud, encloses an annular moulding cavity. The nature of the contact between the mould and the rectifier allows optimal concentricity with the abradable layer. However, the corresponding mould is particularly difficult to handle due to its weight. The cost of the components of the mould constitutes a significant investment on account of the complexity of the mould and of the required fixing means thereof, seals thereof, and centring surfaces thereof. The cleaning of the mould represents a considerable proportion of the usage cost thereof. Also, the shroud can have a deviation of concentricity with the outer shroud, which is reflected by a variation of the thickness of the abradable layer.

SUMMARY

The object of the invention is to overcome at least one of the problems posed by the prior art. More precisely, the object of the invention is to simplify a mould for injection of an abradable layer inside a shroud of an axial-flow turbomachine. A further object of the invention is to simplify the method for moulding a resin layer inside an inner shroud of an axial-flow turbomachine.

The invention relates to a mould for injection of a layer of abradable material inside an inner shroud of an axial-flow turbomachine, the mould comprising a circular wall extending axially and two annular walls extending radially outwardly from the axial ends of the axial wall; the walls being configured to form an annular moulding cavity inside the inner shroud in combination with the inner shroud, this being noteworthy in that each radial wall of the mould comprises an annular hook intended to be in contact with the outer surface of the inner shroud so as to allow the mould to be held in relation to the shroud.

In accordance with various advantageous embodiments of the invention the hooks form annular grooves that are open axially towards one another, and each hook comprises an annular retention surface configured to allow a radial retention between the hook and the shroud, and an annular stop surface configured to come into radial abutment against the inner shroud, the annular surfaces being coaxial.

In accordance with various advantageous embodiments of the invention the mould is segmented, and the mould can be made of a polymeric material.

In accordance with various advantageous embodiments of the invention the mould is formed from two to sixteen angular segments, e.g., from four to twelve angular segments, at least one of the segments comprises planar and parallel ends, along the circumference, and at least one of the segments comprises planar ends of which the planes are inclined by at least 60°, for example at least 90°.

In accordance with various advantageous embodiments of the invention the radially outer ends of the radial walls have outer guide surfaces, in various embodiments conical, which spread apart from one another outwardly so as to facilitate the spreading of the hooks as the shroud is inserted into the mould.

In accordance with various advantageous embodiments of the invention the axial wall comprises a thinner annular portion disposed axially at the centre thereof, the thickness of the axial wall can be less than the thickness of the radial walls.

In accordance with various advantageous embodiments of the invention the axial length of the axial wall is greater than the radial height of each radial wall, the revolution profile of the axial wall can be substantially curved inwardly, such that, as the resin is injected, the resin tends to arch the revolution profile of the axial wall inwardly so as to better press the radial walls against the inner shroud.

The invention also relates to a method for moulding a resin layer, in particular of abradable material, inside an inner shroud of an axial-flow turbomachine. In various embodiments, the method comprises the steps of: (a) providing or producing an inner shroud of a turbomachine, the shroud being connected to an annular row of stator blades, (b) placing a mould against the inner shroud so as to define an annular moulding cavity inside the shroud, (c) injecting a resin inside the moulding cavity, this being noteworthy in that the mould comprises annular hooks configured to hold the mould against the shroud, and in that, during step (b), placing the mould against the shroud, the mould is deformed so as to engage the shroud in the hooks of the mould.

In accordance with various advantageous embodiments of the invention the mould comprises at least two hooks disposed upstream and downstream of the shroud, and, during step (b), placing the mould, the shroud is engaged in the hooks, spreading these apart axially from one another.

In accordance with various advantageous embodiments of the invention each hook provides a seal between the mould and the shroud, for example, a circular seal.

In accordance with various advantageous embodiments of the invention, during step (b), placing the mould against the shroud, the mould is pressed radially against the inner shroud.

In accordance with various advantageous embodiments of the invention the hooks each have a radial stop surface and a radial retention surface for retaining the mould on the shroud, the surfaces being radially opposed and possibly annular, and, during step (b), placing the mould against the shroud, the radial stop surface hugs the shroud over the entire length thereof.

In accordance with various advantageous embodiments of the invention the mould comprises an annular wall extending axially between the hooks, and, during step (b), placing the mould against the shroud, the axial wall is bent, the axial wall can comprise a revolution profile that is arched as the mould is placed against the shroud.

In accordance with various advantageous embodiments of the invention, during step (c), injection, the resin exerts a pressure against the axial wall and arches this so as to bring the annular hooks closer together, pressing them against the inner shroud, the resin can comprise silicone.

The invention also relates to a turbomachine comprising an inner shroud with an annular layer of abradable material moulded inside the inner shroud, the abradable layer being moulded in accordance with a moulding method noteworthy in that the moulding method corresponds to the invention and also comprises a step of (e) demoulding from the mould by deforming the mould so as to spread the hooks apart axially.

In accordance with various advantageous embodiments of the invention at least one, or each hook is delimited by a guide surface.

In accordance with various advantageous embodiments of the invention the hooks are distanced radially from the axial wall, in various embodiments by a distance greater than the thickness of the axial wall.

In accordance with various advantageous embodiments of the invention the radial height of at least one, or each hook is greater than or equal to the radial height of the associated guide surface.

In accordance with various advantageous embodiments of the invention at least one, or each retention surface comprises a curved revolution profile, which can form a quarter circle.

In accordance with various advantageous embodiments of the invention at least one, or each stop surface is substantially tubular and can be parallel to the axis of the turbomachine.

In accordance with various advantageous embodiments of the invention the stop surfaces are parallel.

In accordance with various advantageous embodiments of the invention the radial walls overlap radially.

In accordance with various advantageous embodiments of the invention the radial walls are arranged facing one another, and can be generally parallel.

In accordance with various advantageous embodiments of the invention the hooks are configured to lock radially on an axial end of the shroud, in various embodiments to axially pinch the shroud.

In accordance with various advantageous embodiments of the invention at least one, or each hook comprises the form of an annular groove, and can be open axially.

In accordance with various advantageous embodiments of the invention the radial height of at least one, or each annular groove is greater than the axial depth of the groove.

In accordance with various advantageous embodiments of the invention the mould is configured to deform resiliently as the shroud is inserted inside the hooks.

In accordance with various advantageous embodiments of the invention the annular hooks allow a radial locking of the mould relative to the shroud, and/or the hooks are disposed at opposite axial ends of the mould.

In accordance with various advantageous embodiments of the invention the tubular portion is intended to be disposed inside the inner shroud, and/or each annular wall is intended to be in contact with an axial end of the inner shroud.

In accordance with various advantageous embodiments of the invention the mould forms a spring, and/or the mould forms a clamp.

The invention advantageously makes it possible to utilize the rigidity of the inner shroud in order to reduce that of the mould, wherein the latter can then be made thinner and lighter. It can also become substantially flexible. The inner shroud then becomes a positioning support and a reference for the circularity of the abradable layer. The invention also advantageously makes it possible to improve the homogeneity of the thickness of a layer of resin moulded inside an inner shroud of an axial-flow turbomachine.

The self-stable nature of the mould segments advantageously makes it possible to reduce the holding supports, which makes it possible to reduce the thermal capacity of the tooling, as does the production of the mould segments from a polymer. With placement in a heat chamber, the temperature rises more quickly and reduces the production time.

The use of the polymer is particularly advantageous in the case of composite shrouds because it limits the differential expansion. The weight of each segment can be approximately 100 grams. The manual placement of each segment is simple, and the space necessary for storage thereof is reduced.

The invention advangenously makes it possible to reduce the costs of the mould because it makes it possible to adapt to different, but close diameters and axial lengths. Thus, a turbomachine comprising different inner shrouds with significant geometric changes could receive abradable tracks with use of the same mould model thanks to the flexibility thereof.

The low cost of the segments enables a single use, as a result of which the erosion of the mould becomes negligible in spite of the presence of the charge in the resin. The step of cleaning of the mould is also eliminated, which further reduces the costs.

DRAWINGS

FIG. 3 shows a diagram of the moulding method according to various embodiments of the invention.

FIG. 4 illustrates a resin injection mould according to various embodiments of the invention.

FIG. 5 sketches the profile of the mould according to various embodiments of the invention.

Figure 6:
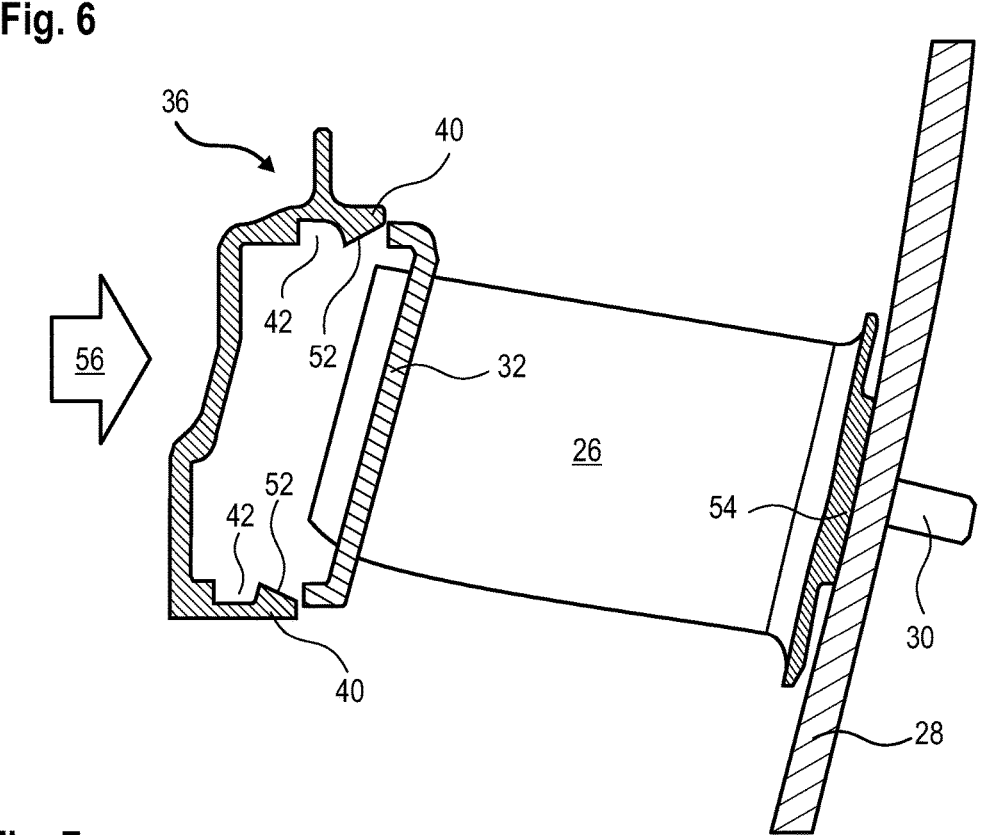

FIG. 6 illustrates a first intermediate step of placing the mould against the shroud according to various embodiments of the invention.

Figure 7:
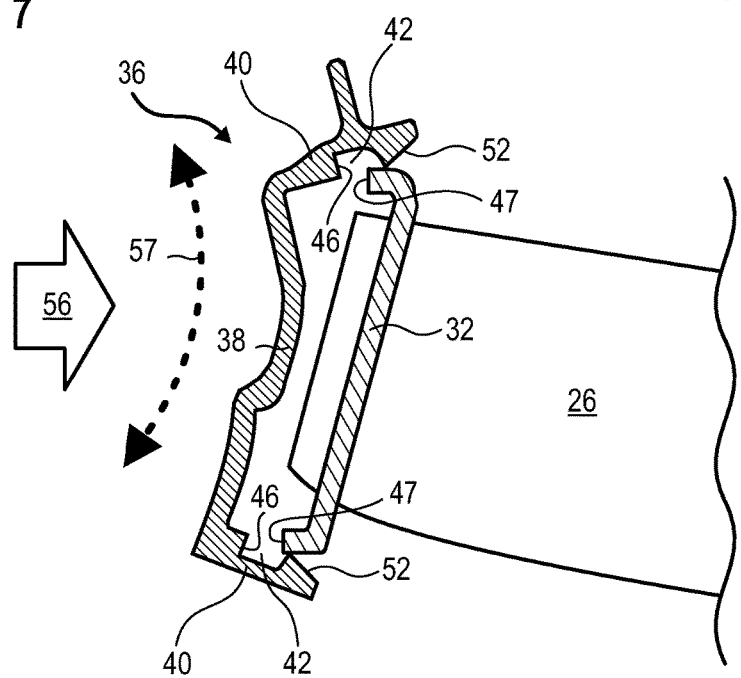

FIG. 7 illustrates a second intermediate step of placing the mould against the shroud according to various embodiments of the invention.

Figure 8:
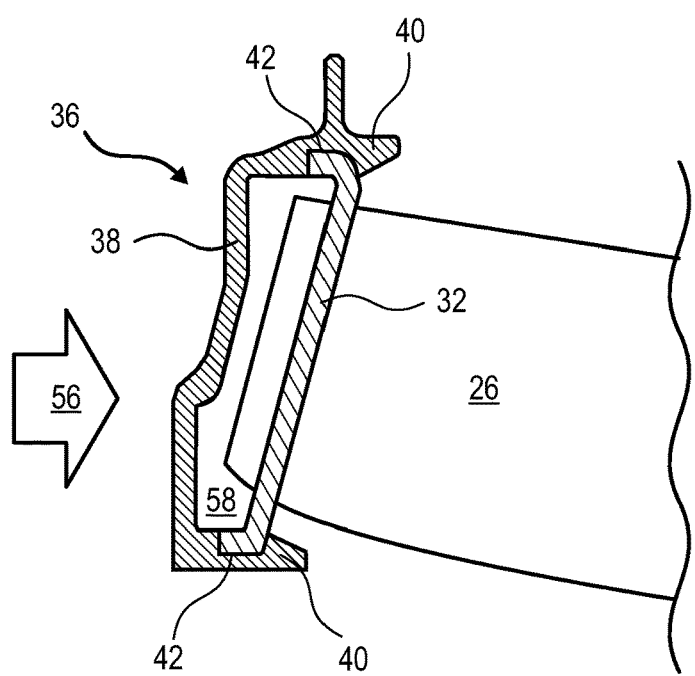

FIG. 8 illustrates the result of the placing the mould against the shroud according to various embodiments of the invention.

Figure 9:
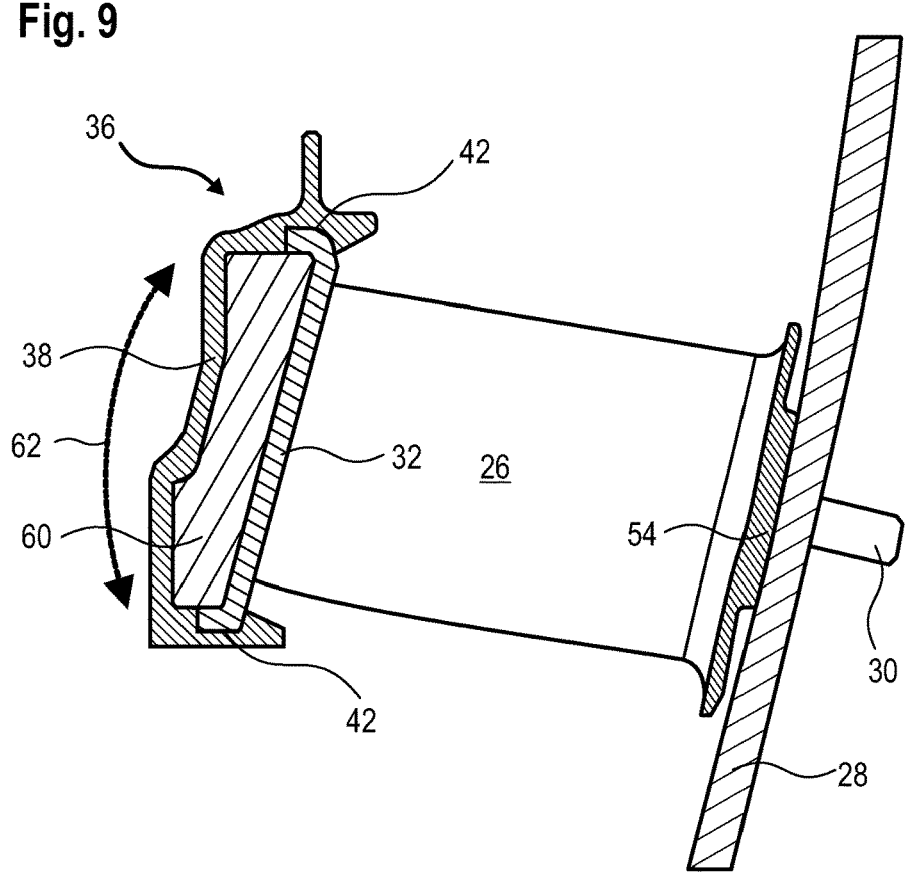

FIG. 9 illustrates the step of injection of a resin in the moulding cavity according to various embodiments of the invention.

DETAILED DESCRIPTION

In the description below, the terms inner or internal and outer or external refer to a positioning relative to the axis of rotation of an axial-flow turbomachine.

Figure 1:
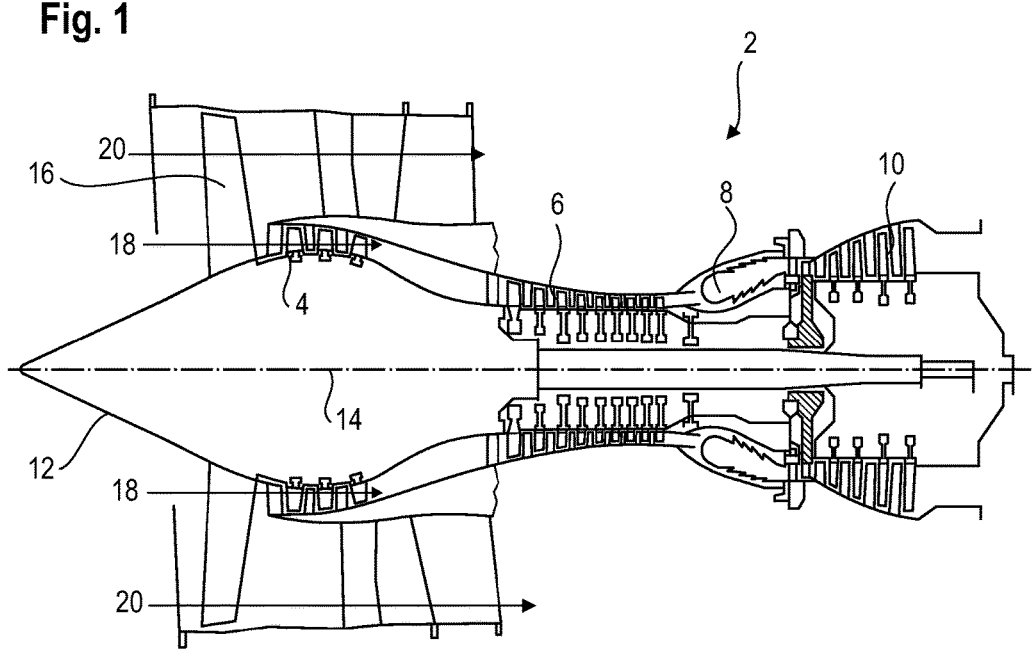
FIG. 1 shows an axial-flow turbomachine according to various embodiments of the invention.

FIG. 1 shows an axial-flow turbomachine in a simplified manner. In this specific case the turbomachine is a turbofan. The turbofan 2 comprises a first compression level, referred to the low-pressure compressor 4, a second compression level, referred to as the high-pressure compressor 6, a combustion chamber 8, and one or more turbine levels 10. During operation the mechanical power of the turbine 10 transmitted via the central shaft to the rotor 12 sets in movement the two compressors 4 and 6. The compressors comprise a number of rows of rotor blades associated with rows of stator blades. The rotation of the rotor about the axis of rotation 14 thereof thus makes it possible to generate a flow of air and to progressively compress this flow of air as far as the inlet of the combustion chamber 8.

An inlet ventilator referred to commonly as a fan or blower 16 is coupled to the rotor 12 and generates a flow of air that is divided into a primary flow 18 passing through the different above-mentioned levels of the turbomachine and a secondary flow 20 passing through an annular conduit (shown in part) along the length of the machine so as to then re-join the primary flow at the outlet of the turbine. The secondary flow 20 can be accelerated so as to generate a response. The primary flow 18 and secondary flow 20 are annular flows and are channelled by the casing of the turbomachine. For this purpose, the casing has cylindrical walls or shrouds, which can be internal and external.

Figure 2:
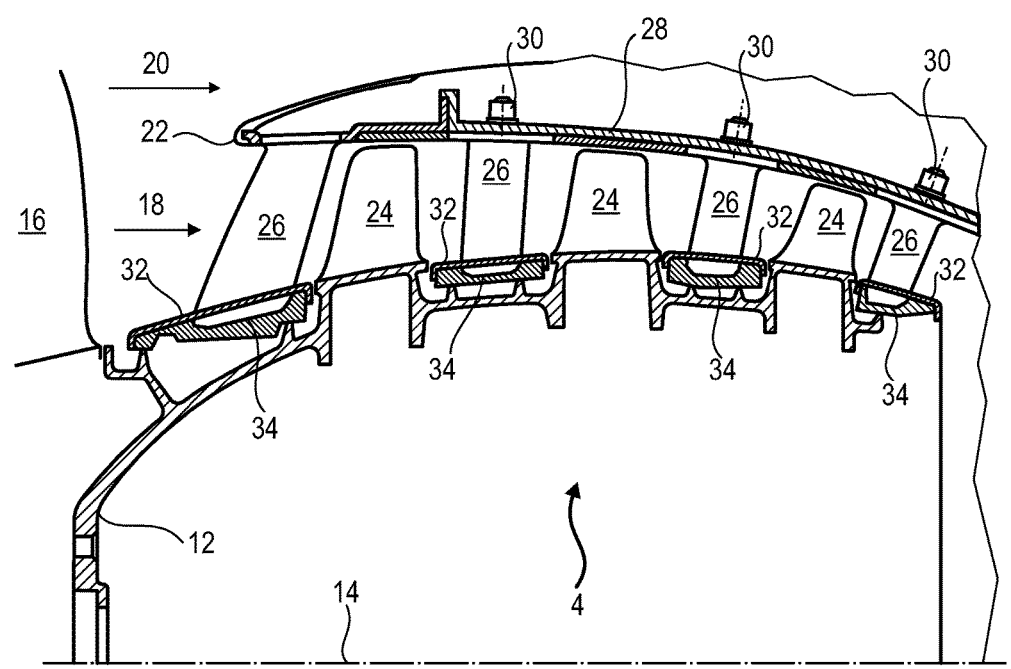
FIG. 2 is a diagram of a turbomachine compressor according to various embodiments of the invention.

FIG. 2 is a sectional view of a compressor of an axial-flow turbomachine 2 such as that in FIG. 1. The compressor can be a low-pressure compressor 4. Here, part of the fan 16 and the separation beak 22 of the primary flow 18 and of the secondary flow 20 can be seen. The rotor 12 comprises a number of rows of rotor blades 24, in the present case three.

The low-pressure compressor 4 comprises a plurality of rectifiers, e.g., in the present case four, which each contain a row of stator blades 26. The rectifiers are associated with the fan 16 or with a row of rotor blades 24 in order to rectify the flow of air so as to convert the speed of the flow into pressure.

The stator blades 26 extend essentially radially from an outer casing 28 and can be fixed there with the aid of a fixing pin 30. The inner ends of the stator blades 26 can support an inner shroud 32. Each inner shroud 32 has a circular form and can be segmented. At least one, or each inner shroud 32 can be formed of angular segments. At least one, or each inner shroud 32 can be structured and operable to connect a plurality of stator blades 26 from the same row. Each inner shroud 32 can be structured and operable to guide and/or to delimit the primary flow 18.

At least one, or each inner shroud 32 can comprise a gasket layer, such as an abradable layer 34 or friable layer, which is able to wear by friction with the rotor. Each abradable layer 34 can be intended to cooperate with seal lips, or annular fins formed on the outer surface of the rotor 12 so as to ensure a seal. Each abradable layer 34 can be silicone-based. The combination of seal lips and of an abradable layer makes it possible to limit the recirculations that are re-injected upstream of the inner shroud 32 along the rotor 12.

FIG. 3 shows the diagram of the method for moulding a resin layer inside a turbomachine shroud. The method can be a method for moulding abradable material in an inner shroud of an axial-flow turbomachine. The resin can become a layer of abradable material after polymerization.

In various embodiments, the method can comprise the linking of the following steps, exemplarily illustrated, but not limited to the following order:

(a) providing or producing an inner turbomachine shroud, the shroud being connected to an annular row of stator blades, as illustrated at 100, (b) placing a mould against the inner shroud so as to define an annular moulding cavity inside the shroud, as illustrated at 102, (c) injecting a resin inside the moulding cavity, as illustrated at 104, (d) polymerizing the resin, as illustrated at 106;

(e) demoulding the shroud and the abradable layer, as illustrated at 108.

It should be noted that polymerization can continue after the demoulding step 108.

FIG. 4 shows a mould portion or segment 36 for the injection of a layer of abradable material, such as a layer of elastomer or silicone resin.

The mould 36 can be circular and can form a closed or open loop. The mould 36 can be placed in one piece inside the shroud. The mould 36 can be applied progressively to the interior of the shroud, following the contour of the shroud. Or, the mould 36 can be segmented. In various embodiments, the mould 36 can be formed of a plurality of angular mould segments 36, which are disposed end-to-end to form a loop in the shroud.

The edges of the mould segments can be bevelled. The mould 36 can be formed of at least two segments, for example eight segments. The edges of some segments can be parallel, and other segments can have edges inclined by at least 60°, for example forming right angles. The segments with right-angled edges can be installed first, then those with parallel edges can be inserted so as to form an alternation. This configuration makes it possible to form a self-stable assembly resulting from the injection pressure. The segments with inclined edges can form keystones. A mould segment 36 can comprise an injection orifice or a vent hole (not shown).

The mould segments 36 can be made of polymer, in various embodiments by additional fabrication, or by extrusion. This material can increase the flexibility and can preserve a reduced weight. The thermal capacity is low and can have a coefficient of expansion close to that of a composite shroud.

The mould 36 can have a generally "U"-shaped revolution profile. The mould 36 has a circular or annular wall 38, which extends axially, in various embodiments mostly axially. The mould 36 can comprise radial walls 40, which extend generally radially, for example generally perpendicularly to the axial wall 38. The mould 36 can comprise a radial wall 40 at each axial end of the axial wall 38. At least one, or each radial wall 40 can comprise an annular hook 42.

The mould 36 can comprise at least one annular reinforcement flange 44, for example an axial flange disposed on a radial wall 40. This flange can also facilitate the placing the mould 36, offering a greater surface area to bend the mould 36 as this is placed in position or during demoulding. At least one flange 44 can be arranged radially in line with the associated hook 42.

The mould 42 can have a revolution profile about the axis of rotation of the turbomachine. The revolution profile is in a plane comprising the axis of rotation of the turbomachine.

FIG. 5 shows the profile of the injection mould 36.

The axial wall 38 can have a general tubular shape, in various embodiments conical or ogival. The axial walls 38 can have annular steps. The axial wall 38 can have variations of radius in the axial direction. This feature makes it possible to form an abradable layer of finished dimension.

At least one, or each annular hook 42 can form an axially open annular groove. The annular hooks 42 can be arranged facing one another, for example axially. The hooks 42 can be offset radially. At least one, or each hook 42 can comprise a radial stop surface 46 and/or a radial retention surface 48. These surfaces can be circular or annular, and can be coaxial. The mould 36 comprises an annular moulding surface 50, which extends from one hook 36 to the other, and/or which is delimited along the circumference by at least one, or each hook 36; in various embodiments with the aid of a stop surface 46.

At least one, or each radial wall 40 outer radial end can have an annular guide surface 52, which can be conical. The guide surfaces 52 can spread apart from one another outwardly. The guide surfaces 52 can extend mostly radially. The guide surfaces 52 can provide each radial wall 40 with an annular point shape.

The axially measured length of the axial wall 38 is greater than the radially measured height of at least one, or each radial wall 40. The moulding surface, i.e. the surface exposed to the resin, of the axial wall 38 is greater than the moulding surface of each radial wall 40; this makes it possible to concentrate the effects of the pressure of the resin on the mould 36. In addition, the axial wall 38 can be thinner than at least one, or each radial wall 40, so as to promote the deformation of the axial wall 38 under the action of the pressure of the injected resin.

FIG. 6 shows a first intermediate phase of step (b), placing the mould 36 against the inner shroud 32.

An outer casing 28 of a compressor with blades 26 and one or more shrouds 32 is provided or fabricated beforehand. The casing 28 can be a casing of a compressor, such as that shown in FIG. 2. The casing 28 can be made of a composite, for example with an organic resin and a fibrous preform. The stator blades 26 are fixed on the casing 28 and are disposed in annular rows. The stator blades 26 can comprise platforms 54 plated against the inner surface of the casing 28. The platforms 54 can comprise fixing means 30, such as threaded rods inserted into orifices in the casing. The casing 28 is disposed vertically, flat against one of the axial faces thereof; for example against the downstream face.

The inner ends of the blades 26 serve as a fixing support for the inner shrouds 32. These have openings into which the blade ends are introduced. The blade ends 26 are then fixed to the shroud 32. The fixing can be provided with the aid of a retaining plate. The play between the openings and the blade ends can be closed with the aid of a silicone seal, or with the aid even of the abradable material. Moulding masks can then be applied over the openings, opposite the injection mould 36.

The mould 36 is brought against the inner shroud in the direction of the arrow 56. It is advanced radially from the inside. The outer ends of the radial walls 40 thereof come into contact with the shroud 32, for example downstream and upstream, over the circular edges downstream and upstream of the, or each shroud 32. With regard to the mould 36, the contact can be made at guide surfaces 52. The shroud 32 can be bevelled opposite the guide surfaces. Pressing the mould 36 against the shroud 32 can make it possible to spread, or to open the mould 36.

FIG. 7 shows a second intermediate phase of the step (b), placing the mould 36 against the shroud 32. During this step the revolution profile of the mould is bent, in various embodiments arched so as to open the mould.

By pressing the mould radially towards the shroud 32 in the direction of the arrow 56, the mould tends to open axially. The revolution profile of the wall 38 bends in the direction of the arrow 57. The guide surfaces 52 slide against the shroud 32. The guide surfaces 52 can be inclined relative to one another by an angle less than 90°, for example less than 60°, e.g., less than 45°; in various embodiments less than 30° so as to reduce the radial force necessary for the axial opening of the mould 36. The axial wall 38 forms a virtual circular pivot for the hooks 42 as it bends.

The mould 36 opens so that the shroud 32 enters the hooks 42. The push movement is continued until the shroud 32 is totally engaged in the hooks 42, for example until the shroud 32 rests against the stop surfaces 46 of the hooks 42. The retention surfaces cover and/or hug the outer surface of the shroud partially. The hooks 42 then allow a radial positioning, a retention, a locking between the shroud 32, and also an indexing. The shroud 32 can comprise reception surfaces 47 intended to receive the stop surfaces 46 of the hooks 42. The reception surfaces 47 can be inner surfaces, and can exhibit annular and/or arcuate shapes. The reception surfaces 47 and the stop surfaces 46 of the hooks 42 can form the moulding interface.

The shroud 32 can be introduced into the two hooks 42 at the same time. In various embodiments, the shroud 32 is introduced into one hook 42 after the other, for example into the hook of smallest diameter, then into the other.

FIG. 8 shows the mould 36 in position against the shroud 32.

When the position in abutment is reached, the shroud 32 and the mould 38 delimit a moulding cavity 58. This cavity 58 is an annular cavity resulting from the mould when the mould is in a single piece, or resulting from all the segments thereof; the shroud 32 can also being segmented. The cavity 58 passes around the shroud 32 entirely. The inner ends of the blades 26 can be present in the moulding cavity.

At least one, or each hook 42 hugs the edge upstream or the edge downstream of the shroud 32. A seal can thus be created so as to prevent resin from escaping in spite of the injection pressure, which can be greater than 3 bar or even 10 bar. The surfaces of the hooks 42 can be sealing surfaces. This seal can be entirely sufficient for the injection of a silicone resin, and a mould with at least two injection orifices and/or at least two vents; generally diametrically opposed. The shroud 32 can have radial flanges upstream and downstream; the hooks 42 can also hug these flanges in order to improve the seal.

FIG. 9 shows step (c), injecting resin 60 inside the moulding cavity.

During step (c), injecting resin 60 into the moulding cavity, the pressure rises and remains elevated, at least during the time in which the resin distributes. This pressure exerts a stress against the axial wall 38 and deforms it such that its revolution profile bends, arching in the direction of the arrow 62, for example in the direction opposite that in step (b), placing the mould 36. Since the hooks 42 are connected to the axial wall 38, they follow this deformation and the stress under which they press against the shroud 32 increases. The hooks 42 tend to move towards one another, the revolution profiles of the axial walls tilting towards one another. These deformations and stresses improve the seal between the hooks 42 and the shroud 32, which has the effect of supplementing the effect of any circular seals (not shown). The circular seals can be omitted. The pressure in the moulding cavity can decrease to the extent that the resin polymerizes, and possibly can become zero. Due to injection pressure, the hooks 42 can slightly open themselves. Then, the interfaces between mould and shroud open and pressurized resin can enter therein. It will result in a polymerized resin film covering, at least partially, the reception surfaces of the shroud.

Following the total polymerization of the resin, the mould 42 can be dismantled from the shroud. It can be removed by being deformed, by spreading apart the hooks, then pulling the mould radially inwardly. The mould potentially can be destroyed by the demoulding.

What is claimed is:

1. A kit including a shroud of an axial-flow turbomachine and a mold for injecting a layer of abradable material inside the shroud, the shroud comprising an annular outer surface radially opposed to the abradable layer, said mold comprising:
    a circular axial wall extending axially and including:
        a first circular axial end; and
        a second axial end; and
    two annular walls extending radially outwardly from one of the first axial end and the second axial end of the circular axial wall, the walls of the mold structured and operable to form an annular molding cavity inside the shroud in combination with the shroud,
    wherein each radial wall of the mold comprises an annular hook structured and operable to be in circular contact with the annular outer surface of the shroud so as to allow the mold to be radially held in relation to the shroud's annular outer surface, and
    wherein the radially outer ends of the radial walls have outer conical guide surfaces, which spread apart from one another outwardly so as to facilitate the spreading of the hooks as the shroud is inserted into the mold.

2. The kit of claim 1, wherein the hooks form annular grooves that are open axially towards one another, each hook comprises an annular retention surface structured and operable to allow a radial retention between the hook and the shroud, and an annular stop surface structured and operable to come into radial abutment against the shroud, the annular surfaces being coaxial.

3. The kit of claim 1, wherein the mold is segmented, at least one of the segments comprises planar and parallel ends, along the circumference, and at least one of the segments comprises planar ends of which the planes are inclined by at least 60°.

4. The mould kit of claim 3, wherein the mold is formed from two to sixteen angular segments, and it is made of a polymeric material.

5. The kit of claim 1, wherein the axial wall comprises a thinner annular portion disposed axially at the center thereof.

6. The kit of claim 1, wherein the minimum thickness of the axial wall is less than the average thickness of the radial walls.

7. The kit of claim 1, wherein the axial length of the axial wall is greater than the radial height of each radial wall.

8. A method for molding a resin layer of abradable material inside the shroud of an axial-flow turbomachine, said method comprising the steps of:
    providing a shroud of a turbomachine;
    providing a mold with two annular hooks configured to hold the mold against the shroud, wherein the mold comprises:
        a circular axial wall extending axially and including:
            a first circular axial end,
            and a second axial end;
        two annular walls extending radially outwardly from one of the first axial end and the second axial end of the circular axial wall;
        the walls of the mold structured and operable to form an annular molding cavity inside the shroud in combination with the shroud,
        wherein each radial wall of the mold comprises a respective one of the annular hooks structured and operable to be in circular contact with the annular outer surface of the shroud so as to allow the mold to be radially held in relation to the shroud's annular outer surface,
        wherein the radially outer ends of the radial walls have outer conical guide surfaces, which spread apart from one another outwardly so as to facilitate the spreading of the hooks as the shroud is inserted into the mold;
    placing the mold against the shroud, the shroud being engaged in the hooks by distancing the hooks from one another, so as to define an annular molding cavity inside the shroud; and
    injecting a resin inside the molding cavity in order to form a layer of abradable material inside the shroud.

9. The method of claim 8, wherein each hook forms a seal between the mold and the shroud.

10. The method of claim 9, wherein the hooks comprise a smooth annular surface forming a circular seal between the mold and the shroud.

11. The method of claim 8, wherein placing the mold against the shroud comprises pressing the mold radially against the shroud in an outer direction.

12. The method of claim 8, wherein the hooks each have at least a radial stop surface and at least a radial retention surface for retaining the mold on the shroud, the surfaces being radially opposed and possibly annular, and in that, during placing the mold against the shroud, each radial stop surface hugs the shroud over the entire length thereof.

13. The method of claim 8, wherein the mold comprises an annular wall extending axially between the hooks, and in that, during placing the mold against the shroud, the axial wall is bent.

14. The method of claim 13, wherein during injection, the resin exerts a pressure against the axial wall and arches the axial wall so as to bring the annular hooks closer together, and to press the annular hooks against the shroud, and the resin comprises silicone.

* * * * *